No. 687,190. Patented Nov. 26, 1901.
S. BARTHOLOMEW.
THILL COUPLING.
(Application filed Feb. 15, 1901.)

(No Model.)

Witnesses:
Granville Stofflet.
David V. Runyan

Inventor:
Seth Bartholomew
By William McLoughlin
his Attorney

UNITED STATES PATENT OFFICE.

SETH BARTHOLOMEW, OF STURGIS, MICHIGAN.

THILL-COUPLING.

SPECIFICATION forming part of Letters Patent No. 687,190, dated November 26, 1901.

Application filed February 15, 1901. Serial No. 47,426. (No model.)

*To all whom it may concern:*

Be it known that I, SETH BARTHOLOMEW, a citizen of the United States, and a resident of Sturgis, county of St. Joseph, and State of Michigan, have invented a new and useful Improvement in Thill-Couplings, of which the following is a specification.

My invention relates to improvements in carriage-tongue holders wherein ball-bearings are used in contact with bolts supporting the carriage-tongue; and the object of my invention is to prevent looseness and the rattling noise produced by the carriage-tongue when the supporting-bolts become worn. I attain this object by the mechanism illustrated in the accompanying drawings, in which—

Figure 1:
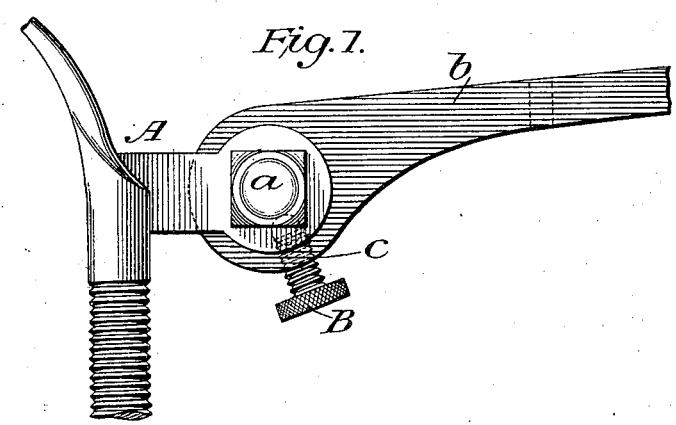
Figure 2:
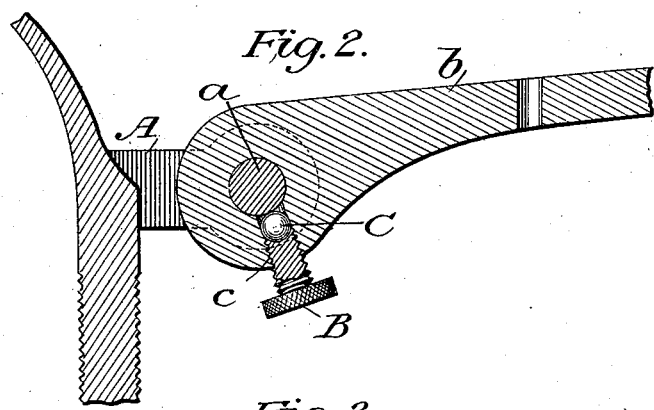
Figure 3:
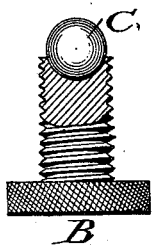

Figure 1 is a side elevation of a portion of a carriage-tongue holder with my improvement attached. Fig. 2 is a cross-sectional view of the same figure. Fig. 3 is a detail view of my improvement.

Similar letters refer to similar parts throughout the several views.

The jaw A, with the screw-bolt $a$ and the clip $b$, resting therein, constitutes a portion of an ordinary carriage-tongue supporter. A screw-bolt B with a concave surface on the screw end thereof supports a steel ball thereon and is inserted in the threaded orifice $c$, cut into the clip $b$, connected with the carriage-tongue. When the bolt $a$, encircled by and supporting the clip $b$, becomes worn therein, the screw-bolt B is turned up and the ball C presses the bolt $a$ against the interior of the clip $b$, and thus prevents noise and rattling and provides a smooth movable pressure conducive to the uniform wear of the parts in contact.

Having now described my invention in full, what I claim as new, and desire to secure by Letters Patent, is—

In a thill-coupling, a thill-iron having a screw-threaded aperture, a steel ball fitting said aperture and a screw-threaded bolt having its inner end concave to fit said ball whereby the ball may be pressed against the thill-bolt as set forth.

SETH BARTHOLOMEW.

Witnesses:
JOHN S. FLANDERS,
FRANK W. FLANDERS.